(12) United States Patent
Xue

(10) Patent No.: US 6,587,155 B1
(45) Date of Patent: Jul. 1, 2003

(54) FADING OF MAIN VIDEO SIGNAL WITHOUT AFFECTING DISPLAY OF SUPERIMPOSED VIDEO SIGNAL

(75) Inventor: Ning Xue, Fremont, CA (US)

(73) Assignee: LSI Logic Corporation, Milpitas, CA (US)

(*) Notice: Subject to any disclaimer, the term of this patent is extended or adjusted under 35 U.S.C. 154(b) by 0 days.

(21) Appl. No.: 09/472,670

(22) Filed: Dec. 27, 1999

(51) Int. Cl.[7] .............................. H04N 9/74; H04N 9/76; H04N 9/79; H04N 9/00; H04N 5/262; G09G 5/02; G11B 27/00

(52) U.S. Cl. .................. 348/595; 348/598; 348/594; 348/587; 348/239; 348/578; 348/584; 345/592; 386/53; 386/8; 386/39

(58) Field of Search .................. 348/595, 598, 348/599, 594, 587, 590, 591, 584, 586, 239, 578; 345/592; 386/53, 8, 39

(56) References Cited

U.S. PATENT DOCUMENTS

| | | | |
|---|---|---|---|
| 4,591,913 A | * 5/1986 | Pohl | 358/183 |
| 4,644,400 A | * 2/1987 | Kouyama et al. | 348/512 |
| 4,833,524 A | * 5/1989 | Wischermann | 358/22 |
| 5,168,363 A | * 12/1992 | Kojima et al. | 358/183 |
| 5,220,433 A | * 6/1993 | Mogamiya et al. | 386/8 |
| 5,260,695 A | * 11/1993 | Gengler et al. | 345/592 |
| 5,428,398 A | * 6/1995 | Faroudja | 348/452 |
| 5,455,633 A | * 10/1995 | Gehrmann | 348/587 |
| 5,477,276 A | * 12/1995 | Oguro | 348/595 |
| 5,502,505 A | * 3/1996 | Nakata et al. | 348/595 |
| 5,600,370 A | * 2/1997 | Furuyama | 348/239 |
| 5,663,771 A | * 9/1997 | Raby | 348/663 |
| 5,689,310 A | * 11/1997 | Murase et al. | 348/595 |
| 5,802,226 A | * 9/1998 | Dischert et al. | 386/53 |
| 5,990,977 A | * 11/1999 | Kaneda et al. | 348/595 |
| 6,301,429 B1 | * 10/2001 | Hirosawa | 386/53 |
| 6,421,498 B1 | * 7/2002 | Fukuoka et al. | 386/53 |

OTHER PUBLICATIONS

Jim Taylor, DVD Demystified, 1998, Chapter 4, pp. 120–186; Glossary, pp. 393–429; and Index, one page.
LSI Logic Corporation, *L64021 DVD Audio/Video Decoder Technical Manuel*, Sep. 1998.
Sony Technology DVP–S330, Overview, http://www.sel.sony.com/SEL/consurmer/dvd/prod_s330.html, Dec. 21, 1999, 1 page.
Sony Technology DVP–S330, Video Features, http://www.sel.sony.com/SEL/consumer/dvd/p2_vid.html, Dec. 21, 1999, 1 page.

(List continued on next page.)

*Primary Examiner*—John Miller
*Assistant Examiner*—Paulos Natnael
(74) *Attorney, Agent, or Firm*—Christopher P. Maiorana, P.C.

(57) ABSTRACT

A fade circuit adjusts the luma as well as one or more chroma components of a main video so that the fade ins and fade outs of the main video do not change the color of an on-screen display image, such as the volume bar. In one embodiment, luma component (Y) is adjusted by subtracting a fade factor from the luma component to form a faded luma component. At the same time, one or more chroma components (Cb and Cr) are scaled by (1) subtracting a predetermined value from the chroma component to form a resultant, (2) multiplying the resultant with a scale factor to form a product, and (3) adding the predetermined value to the product to form a faded chroma component.

19 Claims, 10 Drawing Sheets

OTHER PUBLICATIONS

Sony Technology DVP–S330 Audio Features, http://www.sel.sony.com/SEL/consumer/dvd/p2_aud.html, Dec. 21, 1999, 1 page.

Sony Technology DVP–S330, Convenience, http://www.sel.sony.com/SEL/consumer/dvd/p2_conv.html, Dec. 21, 1999, 1 page.

Sony Technology DVP–S330, Construction, http://www.sel.sony.com/SEL/consumer/dvd/p2_constr.html, Dec. 21, 1999, 1 page.

Sony Technology DVP S–330, Product Specifications, http://www.sel.sony.com/SEL/consumer/dvd/p2_specs.html, Dec. 21, 1999, pages 1–5.

* cited by examiner

FADING OF MAIN VIDEO SIGNAL WITHOUT AFFECTING DISPLAY OF SUPERIMPOSED VIDEO SIGNAL

CROSS-REFERENCE TO SOURCE CODE APPENDIX

Appendix A, which is part of the present disclosure, contains VERILOG source code for implementing one embodiment of this invention as described more completely below.

A portion of the present disclosure contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

A video stream is a sequence of video frames where each frame is a still image. A video player, such as a DVD player, displays one frame after another at approximately 30 frames per second to generate a video. In MPEG-2 format, frames are digitized so that each pixel is represented by a brightness component of luma ("Y") and two color components of chroma blue ("Cb") and chroma red ("Cr"). The color of a pixel is black when its luma value is at a minimum regardless of its chroma blue and chroma red values. Conversely, the color of the pixel is white when its luma value is at a maximum regardless of its chroma blue and chroma red values. Luma, chroma blue, and chroma red have a nominal range of 0 to 255.

A DVD player can read a DVD bitstream from a DVD disk and display on a monitor a main video (that occupies a majority of the area of the monitor) superimposed by a subpicture (hereinafter "SPU"). The subpicture normally occupies a small area of the monitor (e.g., occupies 10% of the total area). A DVD bitstream contains, among other data three elementary streams: a main video elementary stream, an audio elementary stream, and a SPU elementary stream. Subpictures are "[g]raphic bitmap overlays used in DVD-Video to create subtitles, captions, karaoke lyrics, menu hightlighting effects, and so on." See the book entitled "DVD Demystified" by Jim Taylor, p. 424, McGraw-Hill, 1999. Chapter 4 and the glossary of DVD Demystified are hereby incorporated by reference. In one example, the main video is a movie and the SPU is the subtitle for the movie.

In addition to the main video superimposed with the SPU, the DVD player can display (see FIG. 1) an on-screen display ("OSD") of the DVD controls, such as a volume bar, superimposed over the main video. In some DVD players, fade in and fade out are used to replace a background color with the main video (or vice versa). During such replacement, the OSD does not fade in and fade out with the main video so that consumers continue to view the OSD during the transition from the background color to the main video. However, fading (in or out) of the main video affects the colors of the pixels in the portion of the OSD that is superimposed on the main video, so that the pixels in OSD change colors during the fading.

SUMMARY

In one embodiment, a fade circuit (also called "fader") supports transition between display of a video (that has a first portion to be changed and a second portion left unchanged) and display of a background color (such as blue) by adjusting two or more components (e.g., the luma component (Y) and one or both of chroma components (Cb and Cr)) of one or more to-be-displayed pixels (e.g., all pixels in the second portion that is to be left unchanged or alternatively all pixels of the video). The adjustment includes, for example, one or more arithmetic operations, so that the one or more pixels maintain color at two or more moments during the transition (preferably at all times in the transition). By adjusting the luma and chroma components together, one or more colors of the second portion remain constant during the transition between display of the video and the background color. Maintaining colors of the second portion allows a user to clearly see the information displayed by the second portion during the transition.

In one specific implementation, the luma component is adjusted by subtracting (or adding) a fade factor (that changes over time) to form a gradually changing luma component. In this implementation, the chroma components are simultaneously adjusted by another arithmetic operation. In one example, the chroma components are scaled by (1) subtracting a predetermined value from each chroma component to form a resultant, (2) multiplying the resultant with a scale factor (that changes over time) to form a product, and (3) adding the predetermined value to the product to form a faded chroma component. Preferably, but not necessary, the same predetermined value and the same scale factor are used for the two chroma components.

In one embodiment, a mix circuit combines the faded components of a first video (hereinafter referred to as "first pixel components") with components of a second video (hereinafter referred to as "second pixel components"), for example using an arithmetic operation. The combined (mixed) components (hereinafter called "mixed pixel components") are displayed on a monitor wherein the second video is superimposed over the first video. To mix a first pixel component with a second pixel component, one example of a mix circuit adds (1) the product of the first pixel component and a mix weight (mw) with (2) the product of the second pixel component and another mix weight (1−mw). The same results can be accomplished by adding (1) the second pixel component to (2) the product of a mix weight (mw) and the difference between the first pixel component and the second pixel component.

DETAILED DESCRIPTION

In one embodiment, a fader 514 (FIG. 2B) transitions between the display of a background color and the display of a main video image (in a process called "fading") while maintaining the colors of an on-screen display ("OSD") image superimposed thereon. In this embodiment, fader 514 adjusts the luma component as well as one or both chroma components of the main video image so that colors of the OSD image remain at least substantially unchanged (e.g., not noticed by a human). By adjusting the luma and chroma components, the colors of the OSD image are kept unchanged during fading of the main video image. Maintaining colors of the OSD image unchanged allows viewers to clearly see the information displayed by the OSD image during and subsequent to fading.

Figure 2A:
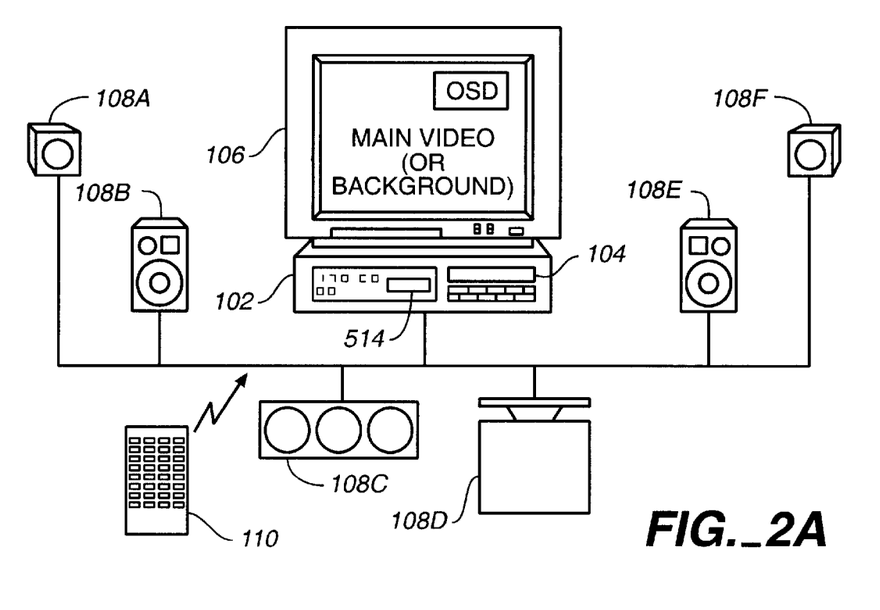
FIG. 2A illustrates a multimedia system including a video playback device 102 that displays a superimposed image having fixed colors during fade in and fade out in one embodiment as described herein.
Figure 2B:
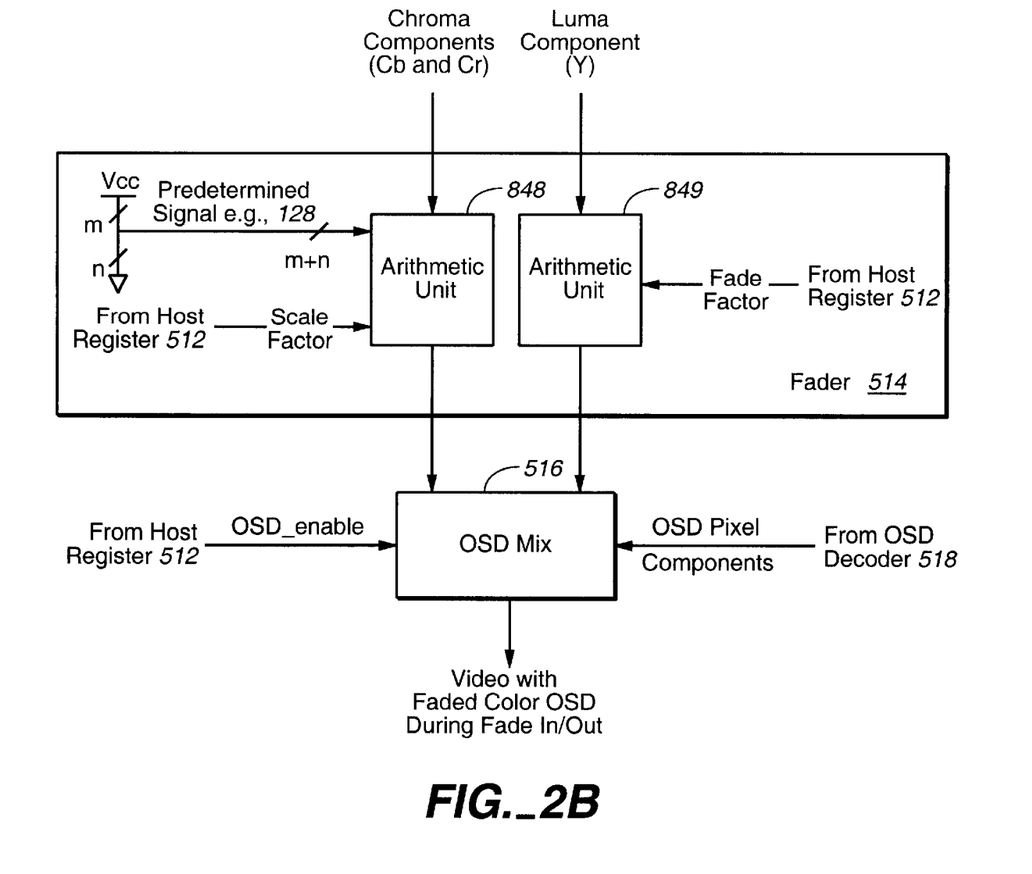
FIG. 2B illustrates, in a block diagram, an embodiment of a fade circuit 514 (also called "fader") of video playback device 102 of FIG. 2A.

In one implementation, fader 514 includes an arithmetic unit 849 that adjusts the luma component to form a faded luma component. Fader 514 further includes another arithmetic unit 848 that adjusts at least one of the chroma components to form one or more faded chroma components. Fader 514 outputs the faded luma and chroma components to an OSD mix 516. OSD mix 516 mixes the faded luma and chroma components with the to-be-displayed OSD luma and chroma components.

In one embodiment, each of fader 514 and OSD mix 516 are included in a video playback device 102 (FIG. 2A) that displays on a monitor 106 the video contents of a multimedia disk in a disk drive 104. Video playback device 102 is controlled in the normal manner, for example, through a remote control 110. Video playback device 102 can also play the audio contents of the multimedia disk through speakers 108A–108F. Video playback device 102 is, for example, a DVD player model DVP S330 available from Sony Corporation of Tokyo, Japan.

Video playback device 102 includes a read head 220 (FIG. 3) that scans a multimedia disk 216 spun by a spindle motor 214 to produce a stream of bits (hereinafter "raw bitstream"). The raw bitstream is filtered by a digital signal processor ("DSP") 210 to produce a filtered bitstream. DSP 210 also controls spindle motor 214 and read head 220 through a power amp 212. The filtered bitstream is buffered by a channel control 222 and demodulated by a demodulator 224 to form a demodulated bitstream. The demodulated bitstream is decoded and error corrected by an error correction decoder ("ECC") 226 to produce a Digital Versatile Disk ("DVD") bitstream. The DVD bitstream is decoded by a multimedia decoder 228 to produce digital audio and video signals. Digital to analog converters ("DAC") 236 and 238 respectively convert the digital audio and video signals to analog signals for display on monitor 106. DAC 238 is, for example, a NTSC/PAL rasterizer for televisions. A host processor 230 controls the operations of DSP 210, ECC 226, and multimedia decoder 228.

In one embodiment, multimedia decoder 228 (FIG. 3) decodes the DVD bitstream to produce at least two elementary bitstreams. The elementary bitstreams includes a main video elementary bitstream and a subpicture ("SPU") elementary bitstream. Multimedia decoder 228 can construct a main video image from the main video elementary bitstream and a SPU image from the SPU elementary bitstream. Multimedia decoder 228 can also superimpose the SPU image over the main video image by combining (mixing) the pixels of the main video image (hereinafter called "main video pixels") with the pixels of the SPU image (hereinafter called "SPU pixels"). The main video image superimposed with the SPU image is hereinafter called "SPU mix image" and the pixels formed from mixing the main video pixels with the SPU pixels are hereinafter called "SPU mix pixels."

Figure 3:
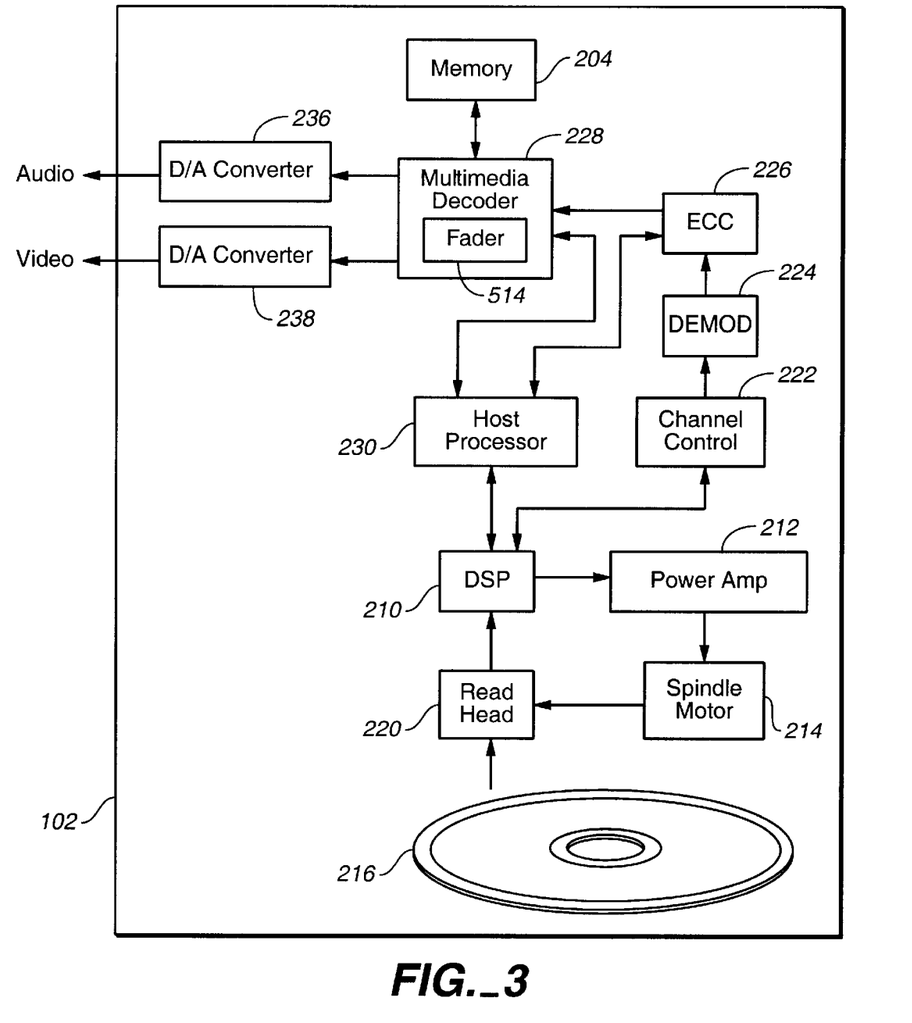
FIG. 3 illustrates, in a block diagram, various components inside video playback device 102 of FIG. 2A.

In this embodiment, multimedia decoder 228 can further superimpose an OSD image over the main video image (or the SPU mix image) by combining (mixing) the main video pixels (or the SPU mix pixels) with the pixels of the OSD image (hereinafter called "OSD pixels"). The main video image (or the SPU mix image) superimposed with the OSD image is hereinafter called "OSD mix image" and the pixels formed from mixing the main video pixels (or the SPU mix pixels) with the OSD pixels are hereinafter called "OSD mix pixels."

Figure 4:
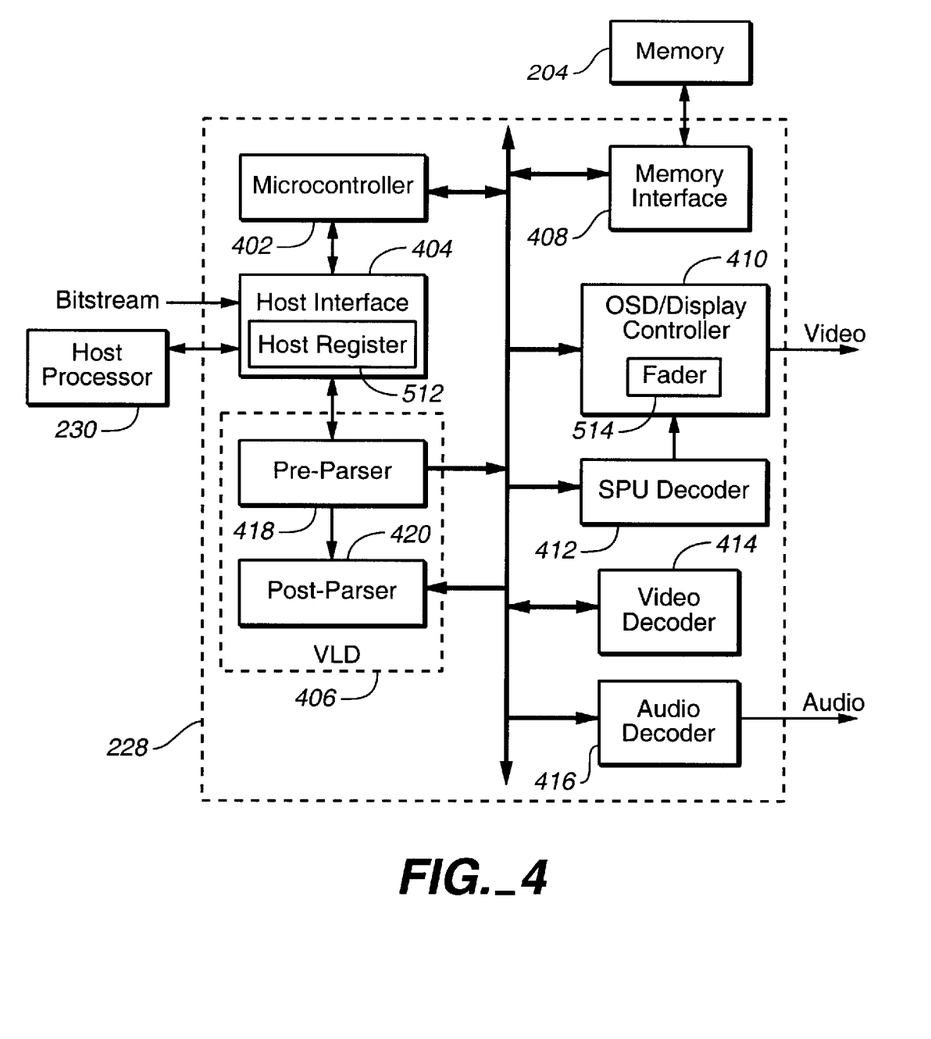
FIG. 4 illustrates, in a block diagram, a multimedia decoder 228 of FIG. 3.

In one embodiment, multimedia decoder 228 includes a microcontroller 402 (FIG. 4) that communicates commands to and from processor 230 through host register 512 (FIG. 4 and FIG. 5B) in a host interface 404. Host interface 404 also communicates data, e.g., a DVD bitstream, to a variable length decoder ("VLD") 406. VLD 406 includes a pre-parser 418 that parses the DVD bitstream into elementary bitstreams. The elementary bitstream includes, for example, an audio elementary bitstream, a main video elementary bitstream, and a SPU elementary bitstream. A memory interface 408 communicates the elementary bitstreams to their respective buffers in a memory 204 (FIG. 3 and FIG. 4).

VLD 406 also includes a post-parser 420 that decodes and passes the audio elementary bitstream, the main video elementary bitstream, and the SPU elementary bitstreams from their respective buffers in memory 204 to their respective devices: an audio decoder 416, a main video decoder 414, and a SPU decoder 412.

Audio decoder 416 decodes, for example, DVD compliant audio elementary bitstreams (e.g., MPEG-2 audio elementary bitstream) to audio packets. Audio decoder 416 saves the decoded audio packets in an area (called "audio packet store") in memory 204.

Video decoder 414 decodes, for example, DVD compliant video elementary bitstreams (e.g., MPEG-2 video elementary bitstream) to main video images. Video decoder 414 saves the main video images in three areas (called "video frame stores") in memory 204. The three video frame stores save, for example, an intra-frame, a forward predicted frame, and a bi-directional predicted frame.

SPU decoder 412 decodes, for example, DVD compliant SPU elementary bitstream to SPU images. SPU decoder saves the SPU images in an area (called "SPU image store") in memory 204.

Figure 1:
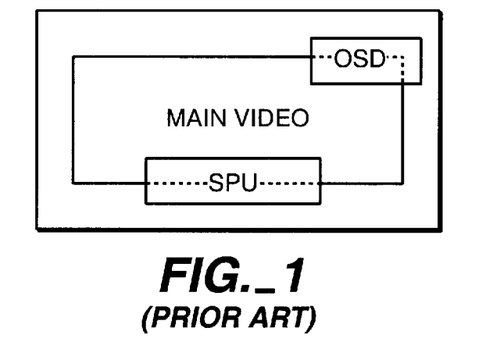
FIG. 1 illustrates a DVD image of the prior art having a main video image, and superimposed thereon each of a subpicture image and an on-screen display image.

An OSD/display controller 410 retrieves the main video images from the main video frame stores in memory 204 and superimposes either a SPU image or an OSD image, or both, over the main video image (FIG. 1). Display controller 410 outputs the final image in 4:2:2 component format.

In one embodiment, OSD/display controller 410 (FIG. 5A) includes a memory address generator 502. Memory address generator 502, under the control of a timing generator 515, addresses the video frame stores in memory 204 through memory interface 408 to read main video pixel data into a vertical filter 504. In one implementation, memory address generator 502 and timing generator 515 are the respective conventional address generator and timing generator described in "L64021 DVD Audio/Video Decoder Technical Manual," which is incorporated by reference in its entirety.

Figure 5A:
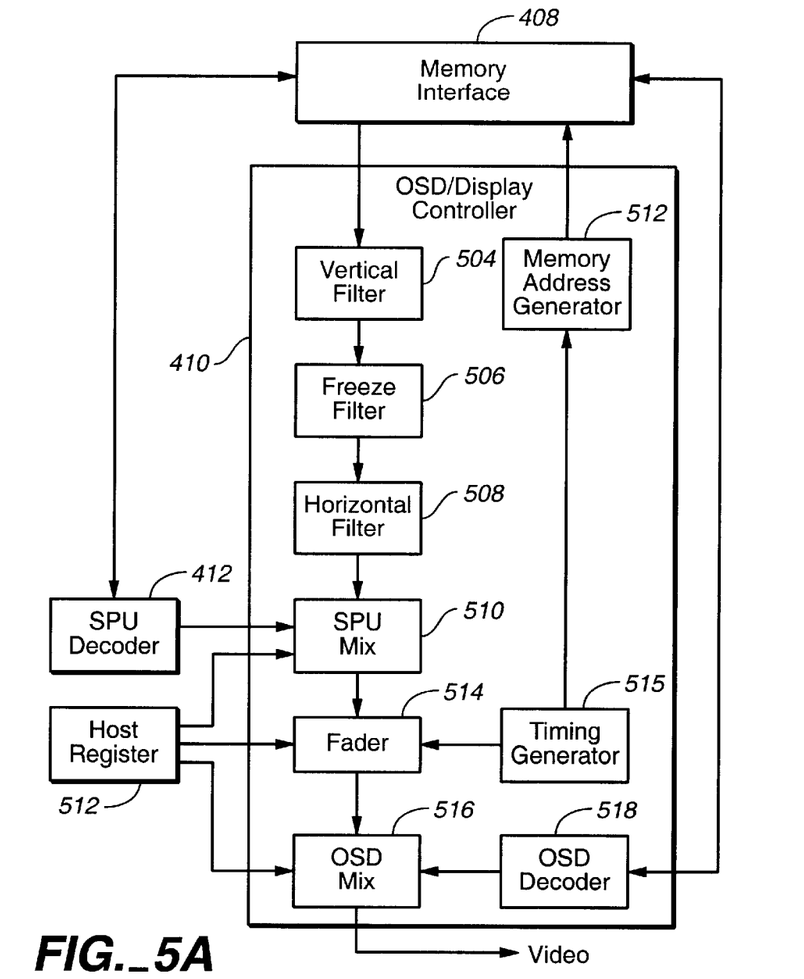
FIG. 5A illustrates, in a block diagram, a display controller 410 of multimedia decoder 228 of FIG. 4 in one implementation.

Vertical filter 504 filters the main video pixel data to vertically scale the main video images and to produce main video images of 4:2:2 component format. A freeze filter 506 filters the main video pixel data to improve the image quality of the main video images in case a main video image is paused. A horizontal filter 508 filters the main video pixel data to horizontally scale the main video images. Horizontal filter 508 passes the main video pixel data to a SPU mix 510. In one implementation, vertical filter 504, freeze filter 506, and horizontal filter 508 are conventional filters described in "L64021 DVD Audio/Video Decoder Technical Manual," which is incorporated by reference above.

Figure 5B:
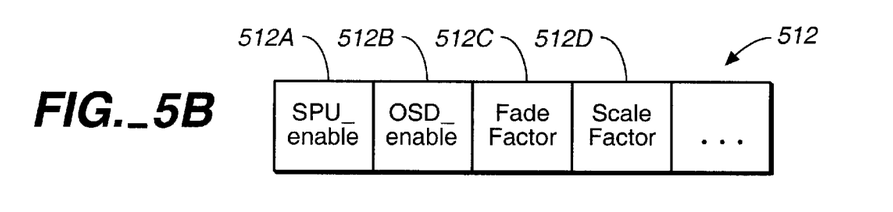
FIG. 5B illustrates various signals held in a host register 512 illustrated in FIG. 5A.
Figure 6:
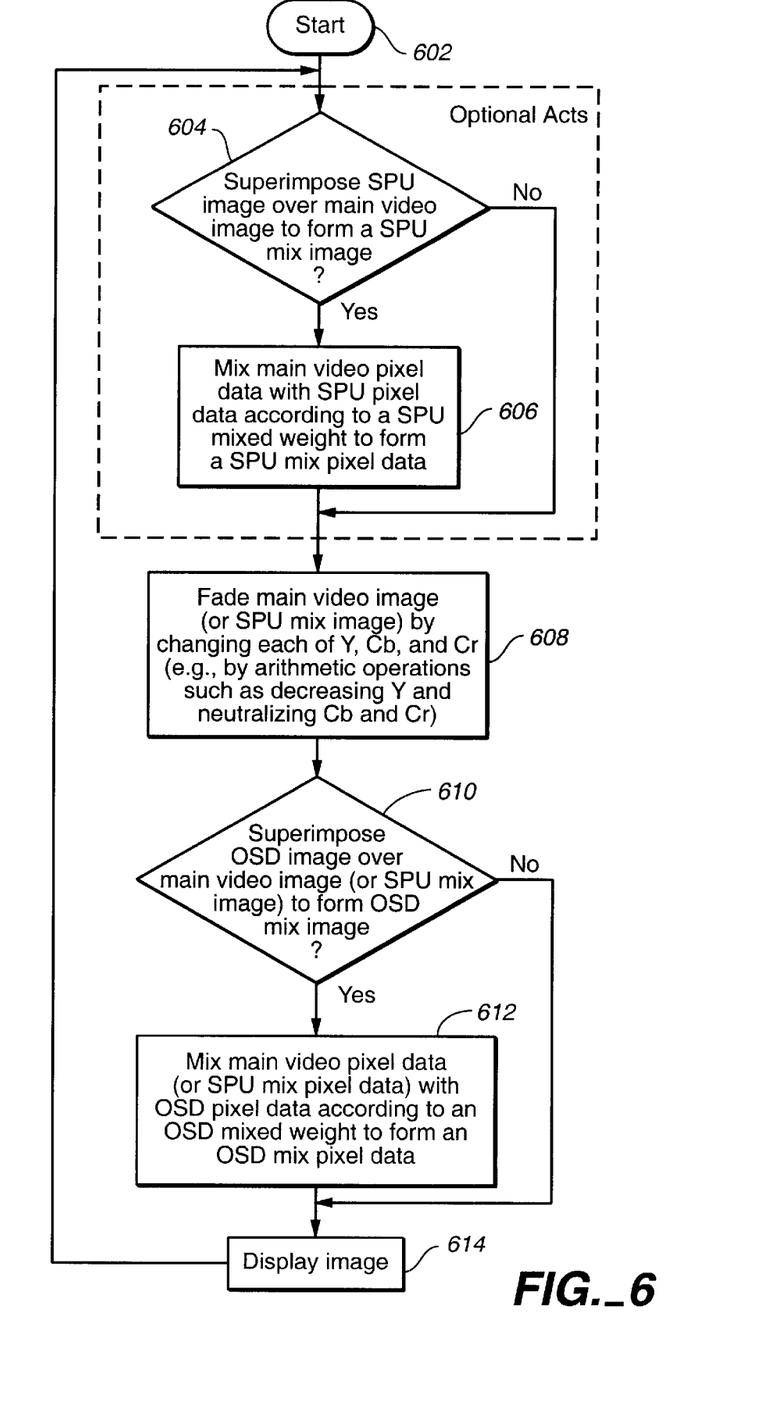
FIG. 6 illustrates, in a flow chart, a method used by display controller 410 of FIG. 5A to fade a video in this implementation.

In one embodiment, display controller 410 starts in action 602 (FIG. 6). Action 602 is followed by action 604. In action 604, display controller 410 determines if host processor 230 desires to superimpose a SPU image over a main video image to form a SPU mix image. Host processor 230 stores an active signal SPU_enable in a storage element 512A of host register 512 (FIG. 5B) if host processor 230 wishes to superimpose a SPU image over a main video image. If storage element 512A stores an active signal SPU_enable, action 604 is followed by action 606. Otherwise, action 604 is followed by action 608.

In action 606, display controller 410 mixes the main video pixel data with the SPU pixel data according to a SPU mix weight (e.g., "$mw_{spu}$") to form a SPU mix pixel data. In one embodiment, display controller 410 includes a SPU decoder 412 (FIG. 4 and FIG. 5A) that addresses the SPU image store in memory 204 to read SPU pixel data into a SPU mix 510. SPU decoder 412 also synchronizes the SPU pixel data to the main video pixel data that are provided to SPU mix 510. In one implementation, SPU decoder 412 is a conventional SPU decoder described in "L64021 DVD Audio/Video Decoder Technical Manual," which is incorporated by reference above.

In one variation, SPU mix 510 mixes the main video pixel data and the SPU pixel data according to the SPU mix weight from SPU decoder 412 as follows.

$$Y_{SPU\ mix}=Y_{video}*mw_{SPU}+Y_{SPU}*(1-mw_{SPU}) \quad (1)$$

$$Cb_{SPU\ mix}=Cb_{video}*mw_{SPU}+Cb_{SPU}*(1-mw_{SPU}) \quad (2)$$

$$Cr_{SPU\ mix}=Cr_{video}*mw_{SPU}+Cr_{SPU}*(1-mw_{SPU}) \quad (3)$$

Subscript "SPU mix" indicates the pixel components of the SPU mix image, subscript "video" indicates the pixel components of the main video image, and subscript "SPU" indicates the pixel components of the SPU image.

Alternatively, the above equations can be rewritten to reduce the number of multiplication operations as follows:

$$Y_{SPU\ mix}=Y_{SPU}+(Y_{video}-Y_{SPU})*mw_{SPU} \quad (4)$$

$$Cb_{SPU\ mix}=Cb_{SPU}+(Cb_{video}-Cb_{SPU})*mw_{SPU} \quad (5)$$

$$Cr_{SPU\ mix}=Cr_{SPU}+(Cr_{video}-Cr_{SPU})*mw_{SPU} \quad (6)$$

When displayed, SPU mix pixel data generates a main video with SPU overlay. Action 606 is followed by action 608. In one embodiment, actions 604 and 606 are optional.

In action 608, display controller 410 fades the main video image (or the SPU mix image if an SPU image was superimposed over a main video image in action 606) by adjusting the chroma components (Cb and Cr) in addition to the luma (Y) components of the pixels. Note that fade in and fade out of just the main video image (or the SPU mix image) can be accomplished by adjusting only the luma values of the main video pixels (or SPU mix pixels). Chroma blue and chroma red components remaining constant during such fading have little impact on the colors of the pixels when the luma components are changed to approach the maximum value (e.g., 255) or the minimum value (e.g., 0).

However, when the main video image is combined with an OSD image (described in detail later), the luma components of the OSD pixels allow the chroma blue and chroma red components of the main video pixels (or SPU mix pixels) to be seen despite the adjustment to the luma components of main video pixels (or SPU mix pixels). This results in an OSD that changes colors during fade in and fade out of the main video image (or SPU mix image) due to chroma blue and chroma red contributions from the main video pixels (or SPU mix pixels).

In one embodiment, display controller 410 includes a fader 514 that adjusts the luma components, the chroma blue components, and chroma red components of the main video pixels (or SPU mix pixels) during fade in and fade out so that the OSD does not change color. In one variation, fader 514 fades the main video image by adjusting the luma component and the two chroma components of the main video pixels as follows.

$$\text{Faded}Y_{video}=Y_{video}-\text{fade factor} \quad (7)$$

$$\text{Faded}Cb_{video}=(Cb_{video}-128)*\text{scale factor}+128 \quad (8)$$

$$\text{Faded }Cr_{vidoe}=(Cr_{video}-128)*\text{scale factor}+128 \quad (9)$$

In another variation, fader 514 fades the SPU mix image by adjusting the luma component and the chroma components of the SPU mix pixels using the same arithmetic operations (7)–(9) as follows.

$$\text{Faded }Y_{SPU\ mix}=Y_{SPU\ mix}-\text{fade factor} \quad (10)$$

$$\text{Faded }Cb_{SPU\ mix}=(Cb_{SPU\ mix}-128)*\text{scale factor}+128 \quad (11)$$

$$\text{Faded }Cr_{SPU\ mix}=(Cr_{SPU\ mix}-128)*\text{scale factor}+128 \quad (12)$$

Host processor 230 controls fade in and fade out by storing values for the fade factor and the scale factor in respective storage elements 512C and 512D of host register 512 (FIG. 5B). Host processor 230 stores a value of 0 for the fade factor and value of 1 for the scale factor if no fading of the SPU mix is desired (no fading of the main video image or the SPU mix image). In any event, the faded luma, chroma blue, and chroma red cannot become less than the minimum value of 0 or greater than the maximum value of 255 (clipped at 0 or 255). The scale factor is also restricted between −1 and 1 to provide a smooth transition between video display and the background color. Host processor 230 sets the fade factor and the scale factor by storing their respective values in respective storage elements 512C and 512D of host register 512. Fader 514 outputs the faded pixel data to an OSD mix 516 (FIG. 5A). Action 608 is followed by action 610.

In action 610, display controller 410 determines if host processor 230 desires to superimpose an OSD image over the main video image (or the SPU mix image if an SPU image was superimposed over a main video image in action 606) to form an OSD mix image. Host processor 230 stores an active signal OSD_enable in a storage element 512B of host register 512 (FIG. 5B) if host processor 230 wishes to superimpose an OSD image over a main video image (or the SPU mix image). If storage element 512B stores an active signal SPU_enable, action 610 is followed by action 612. Otherwise, action 610 is followed by action 614.

In action 612, display controller 410 mixes the main video pixel data (or the SPU mix pixel data) with the OSD pixel data according to an OSD mix weight (e.g., "$mw_{OSD}$") to form an OSD mix pixel data. When displayed, OSD mix pixel data generates a main video image (or a SPU mix image) with OSD overlay. In one embodiment, display controller 410 includes an OSD decoder 518 that, under command of timing generator 515, addresses an OSD image store in memory 204 to read OSD pixel data into an OSD mix 516. OSD decoder 518 synchronizes the OSD pixel data to the main video pixel data (or the SPU mix pixel data) provided to OSD mix 516 from fader 514. OSD pixel data is written into the OSD image store in memory 204 by host processor 230. In one implementation, OSD decoder 518 is a conventional OSD decoder described in "L64021 DVD Audio/Video Decoder Technical Manual," which is incorporated by reference above.

In one variation, OSD mix 516 combines the main video pixel data with the OSD pixel data according to the OSD mix weight from OSD decoder 518 to form the OSD mix pixel as follows.

$$Y_{OSD\ mix} = \text{Faded } Y_{video} * mw_{OSD} + Y_{OSD} * (1 - mw_{OSD}) \quad (13)$$

$$Cb_{OSD\ mix} = \text{Faded } Cb_{video} * mw_{OSD} + Cb_{OSD} * (1 - mw_{OSD}) \quad (14)$$

$$Cr_{OSD\ mix} = \text{Faded } Cr_{video} * mw_{OSD} + Cr_{OSD} * (1 - mw_{OSD}) \quad (15)$$

Subscript "OSD mix" indicates the pixel components of the OSD mix image.

Alternatively, the above equations can be rewritten to reduce the number of multiplication operations as follows:

$$Y_{OSD\ mix} = Y_{OSD} + (\text{Faded } Y_{video} - Y_{OSD}) * mw_{OSD} \quad (16)$$

$$Cb_{OSD\ mix} = Cb_{OSD} + (\text{Faced } Cb_{video} - Cb_{OSD}) * mw_{OSD} \quad (17)$$

$$Cr_{OSD\ mix} = Cr_{OSD} + (\text{Faded } Cr_{video} - Cr_{OSD}) * mw_{OSD} \quad (18)$$

In another variation, OSD mix 516 combines the SPU mix pixel data with the OSD pixel data according to the mix weight (hereinafter called "$mw_{OSD}$") from OSD decoder 518 to form the OSD mix pixel as follows.

$$Y_{OSD\ mix} = \text{Faded } Y_{SPU\ mix} * mw_{OSD} + Y_{OSD} * (1 - mw_{OSD}) \quad (19)$$

$$Cb_{OSD\ mix} = \text{Faded } Cb_{SPU\ mix} * mw_{OSD} + Cb_{OSD} * (1 - mw_{OSD}) \quad (20)$$

$$Cr_{OSD\ mix} = \text{Faded } Cr_{SPU\ mix} * mw_{OSD} + Cr_{OSD} * (1 - mw_{OSD}) \quad (21)$$

Alternatively, the above equations can be rewritten to reduce the number of multiplication operations as follows:

$$Y_{OSD\ mix} = Y_{OSD} + (\text{Faded } Y_{SPU\ mix} - Y_{OSD}) * mw_{OSD} \quad (22)$$

$$Cb_{OSD\ mix} = Cb_{OSD} + (\text{Faced } Cb_{SPU\ mix} - Cb_{OSD}) * mw_{OSD} \quad (23)$$

$$Cr_{OSD\ mix} = Cr_{OSD} + (\text{Faded } Cr_{SPU\ mix} - Cr_{OSD}) * mw_{OSD} \quad (24)$$

Action 612 is followed by action 614. In action 614, display controller 410 provides processed pixel data (main video pixel data, SPU mix pixel data, or OSD mix pixel data) to DAC 238 for display on monitor 106. Action 614 is followed by action 604.

In one implementation, the main video pixel data, the SPU pixel data, and the OSD pixel data are in 4:2:2 component format. Horizontal filter 508 (FIG. 5A) outputs, for example, 8 bits of main video pixel data to SPU mix 510 at each clock pulse. Every 8 bits of main video pixel data represents one of three pixel components (e.g., luma, chroma blue, or chroma red) of the main video image. Accordingly, a pixel component of the main video image is provided to SPU mix 510 at each clock pulse.

Similarly, SPU decoder 412 (FIG. 5A) provides, for example, 8 bits of SPU video pixel data to SPU mix 510 at each clock pulse. Every 8 bits of SPU video pixel data also represents one of three pixel components of the SPU image. SPU decoder 412 synchronizes the pixel components of the SPU image with the pixel components of the main video.

In this implementation, host processor 230 stores signal SPU_enable, signal $OSD_{13}$ enable, signal fade factor, and signal scale factor in respective storage elements 512A–512D. Host processor 230 controls multimedia decoder 228 by writing (in response to user instruction) different values into the just-described storage elements 512A–512D of host register 512. In one example, if a user instructs video playback device 102 to display main video with SPU overlay (e.g., through remote control 110), host processor 230 responds to the user's instruction by storing an active signal SPU_enable in storage element 512A.

In another example, if a user instructs video playback device 102 to stop the main video (or SPU mix) through remote control 110, host processor 230 writes values for fade factor in storage element 512C (e.g., increasing over 2 seconds from 0 to a maximum of 255 to fade out) and scale factor in storage element 512D (decreasing over 2 seconds from 1 to a minimum of 0 to fade out) for one or more frames of the main video (or SPU mix) to transition the main video (or SPU mix) to the background color. In this example, if a user instructs video playback device to play the main video (or SPU mix) through remote control 110, host processor 230 writes values for fade factor signal 512C (decreasing over time to a minimum of 0 to fade in) and scale factor signal 512D (increasing over time to a maximum of 1 to fade in) for each frame of the main video (or SPU mix) to transition the background color to the main video image (or SPU mix).

SPU mix 510 (FIG. 7) includes a subtractor 702 that has ports 701 and 703 respectively coupled to buses 718 and 720. Bus 718 carries a pixel component of the main video image from horizontal filter 508 and bus 720 carries a pixel component of the SPU image from SPU decoder 412. Subtractor 702 subtracts the SPU pixel component signal from the main video pixel component signal and provides a difference signal on a bus 704.

Figure 7:
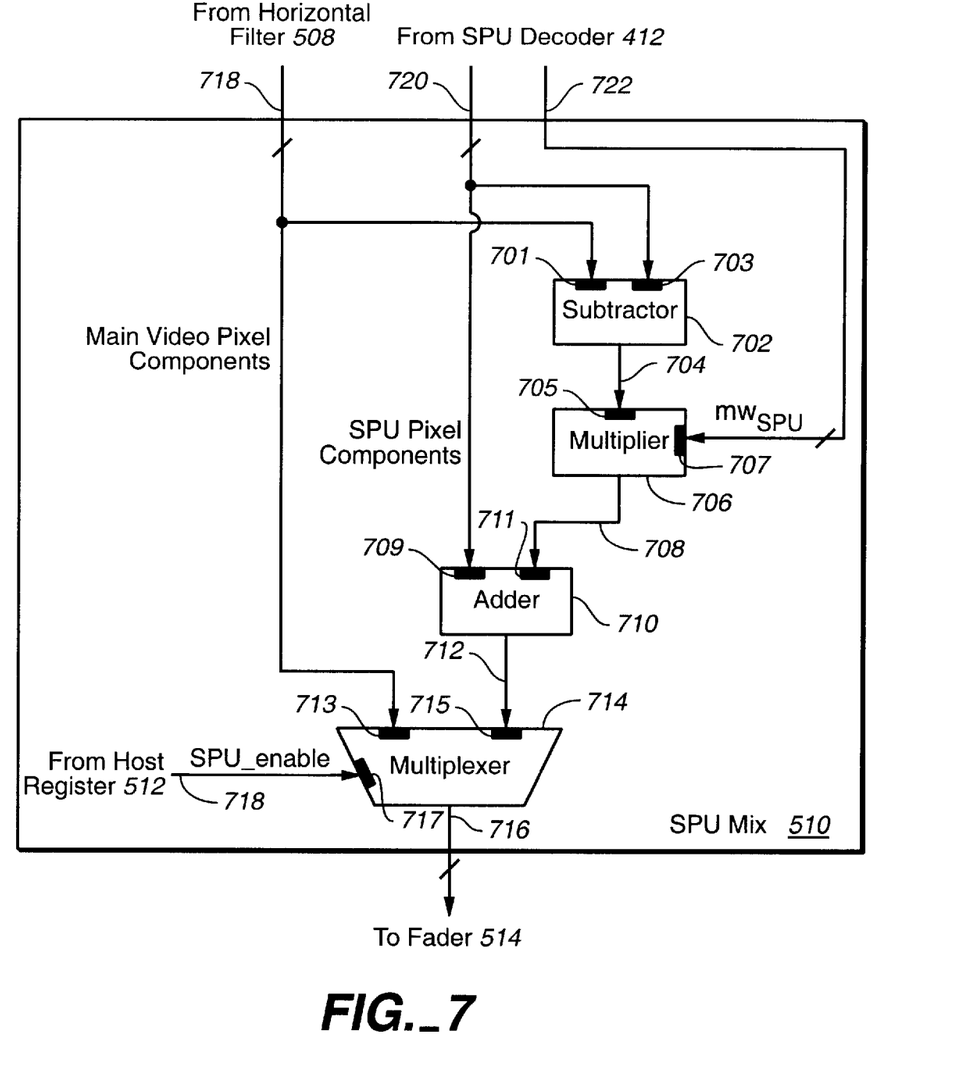
FIG. 7 illustrates, in a block diagram, an embodiment of a subpicture mix 510 (also called "SPU mix") of display controller 410 of FIG. 5A.

A multiplier 706 has ports 705 and 707 respectively coupled to buses 704 and 722. Bus 722 carries a SPU mix weight (e.g., "$mw_{SPU}$") from SPU decoder 412. Multiplier 706 multiplies the signal received on port 705 with the signal of the SPU mix weight and provides a product signal on a bus 708. An adder 710 has a port 709 coupled to bus 720 and a port 711 coupled to bus 708. Adder 710 adds the signal received on port 709 to the signal received on port 711 and provides a result signal on a bus 712.

A multiplexer 714 has ports 713 and 715 respectively coupled to buses 718 and 712. Multiplexer 714 also has a control terminal 717 coupled to line 718 that carries a control signal (e.g., "signal SPU_enable") from SPU_enable bit 512A in host register 512. If signal SPU_enable is active, multiplexer 714 propagates the signals received on terminal 715 (a pixel component of a SPU mix image) to a bus 716. Otherwise, multiplexer 714 propagates the signals received on terminal 713 (a pixel component of the main video image).

Fade circuit 514 (FIG. 8) includes a demultiplexer 802 that has a port 801 coupled to bus 716 from SPU mix 510. Demultiplexer 802 has a control terminal 803 coupled to a line 846 carrying a control signal (also called "component_type") from timing generator 515. Demultiplexer 802 propagates signals received on port 801 (1) to a bus 804 when signal component_type is, for example, active and alternatively (2) to a bus 828 when signal component_type is, for example, inactive. Therefore, timing generator 515 drives active or inactive signal component_type so that demultiplexer 802 passes only the chroma components (Cb and Cr) onto bus 804 and only the luma components (Y) onto bus 828.

Figure 8:
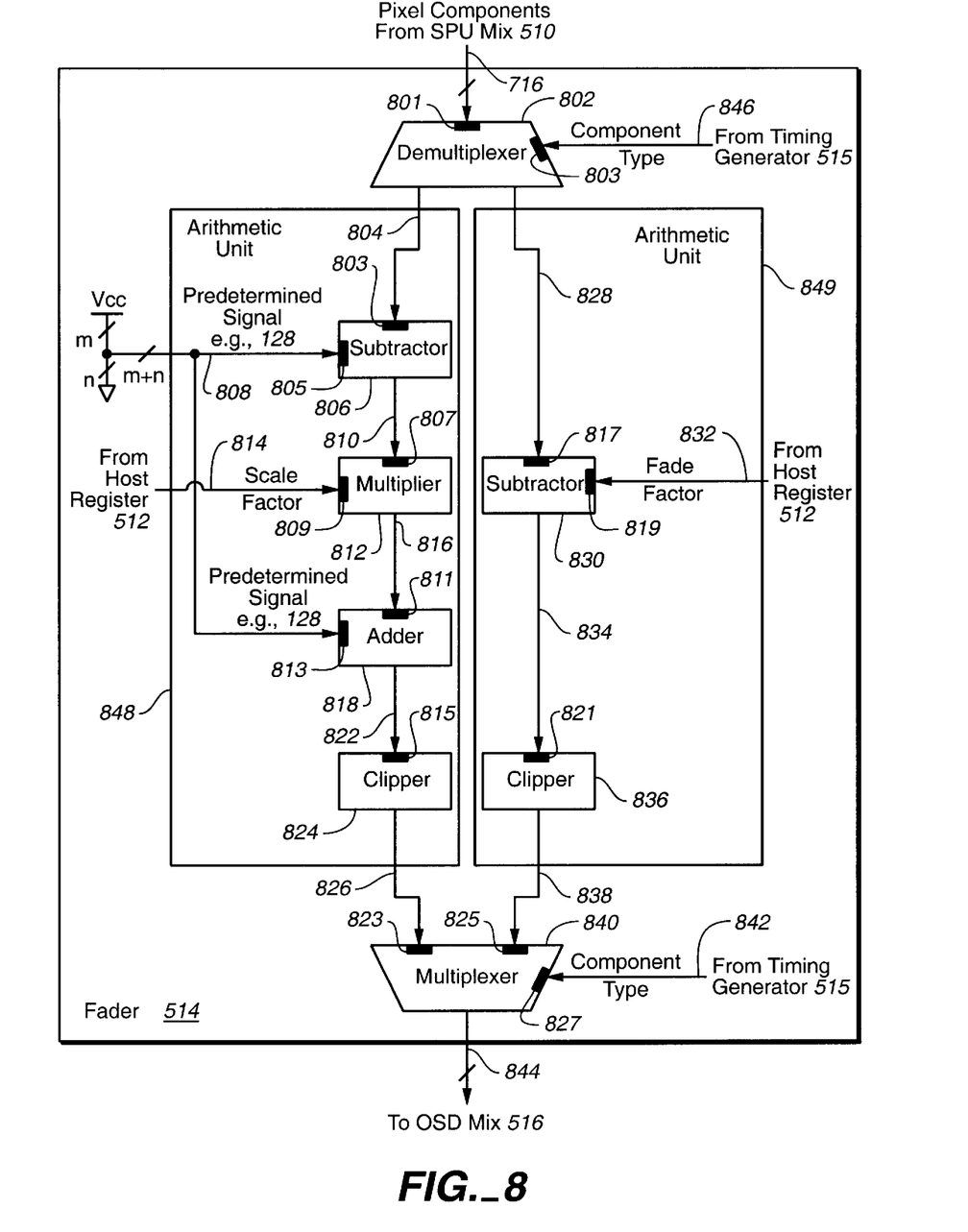
FIG. 8 illustrates, in a block diagram, an embodiment of fader 514 of FIG. 5A.

Chroma components are processed by a subtractor 806, a multiplier 812, an adder 818, and a clipper 824 (e.g., collectively forming arithmetic unit 848). Subtractor 806 has ports 803 and 805 respectively coupled to buses 804 and 808, Bus 808 carries a predetermined signal that is hard-wired in fade circuit 514. For example, the predetermined signal may have m bits of active signals and n bits of inactive signal. In one variation, the predetermined signal has a value of 128 (1 bit of active signal and 7 bits of inactive signal). Subtractor 806 subtracts the predetermined signal from the chroma blue or chroma red signal received on port 803 and outputs a result signal on a bus 810.

Multiplier 812 has ports 807 and 809 respectively coupled to buses 810 and 814. Bus 814 carries a scale factor signal written by host processor 230 in host register 512. Multiplier 812 multiplies the signal received on port 807 with the scale factor signal received on port 809 and outputs a product signal on a bus 816.

Adder 818 has a port 811 coupled to bus 816 and a port 813 coupled to bus 808 that carries the predetermined signal having a value of, for example, 128. Adder 818 adds the predetermined signal to the signal received on port 811 and outputs a result signal on a bus 822.

Clipper 824 has a port 815 coupled to bus 822. If the signal received on port 815 is greater than 255 or less than 0, clipper 824 propagates a respective signal 255 or 0 to a bus 826. Otherwise, clipper 824 propagates the signal received on port 815 on bus 826.

Luma components are processed by a subtractor 830 and a clipper 836 (e.g., collectively forming arithmetic unit 849). Subtractor 830 has ports 817 and 819 respectively coupled to buses 828 and 832. Bus 832 carries a fade factor signal set by host processor 230 in host register 512. Subtractor 830 subtracts the fade factor signal from the luma signal received on port 817 and outputs a result signal on a bus 834.

Clipper 836 has a port 821 coupled to receive a signal from bus 834, and functions in the same manner as that described above in reference to clipper 824, to generate a signal on bus 838.

A multiplexer 840 has ports 823 and 825 respectively coupled to buses 826 and 838. Multiplexer 840 also has a control terminal 827 coupled to a line 842 carrying signal component_type. Multiplexer 840 propagates to a bus 844 (1) signals received on port 823 if signal component_type is, for example, active and (2) signals received on port 825 if signal component_type is, for example, inactive.

OSD mix 516 (FIG. 9) includes a subtractor 902 that has ports 901 and 903 respectively coupled to buses 844 and 920. Bus 844 carries a pixel component from fader 514 and bus 920 carries a pixel component of an OSD image from OSD decoder 518. Subtractor 902 subtracts the signal of the OSD pixel component from signal of the pixel component received on port 901 and provides a difference signal on a bus 904.

Figure 9:
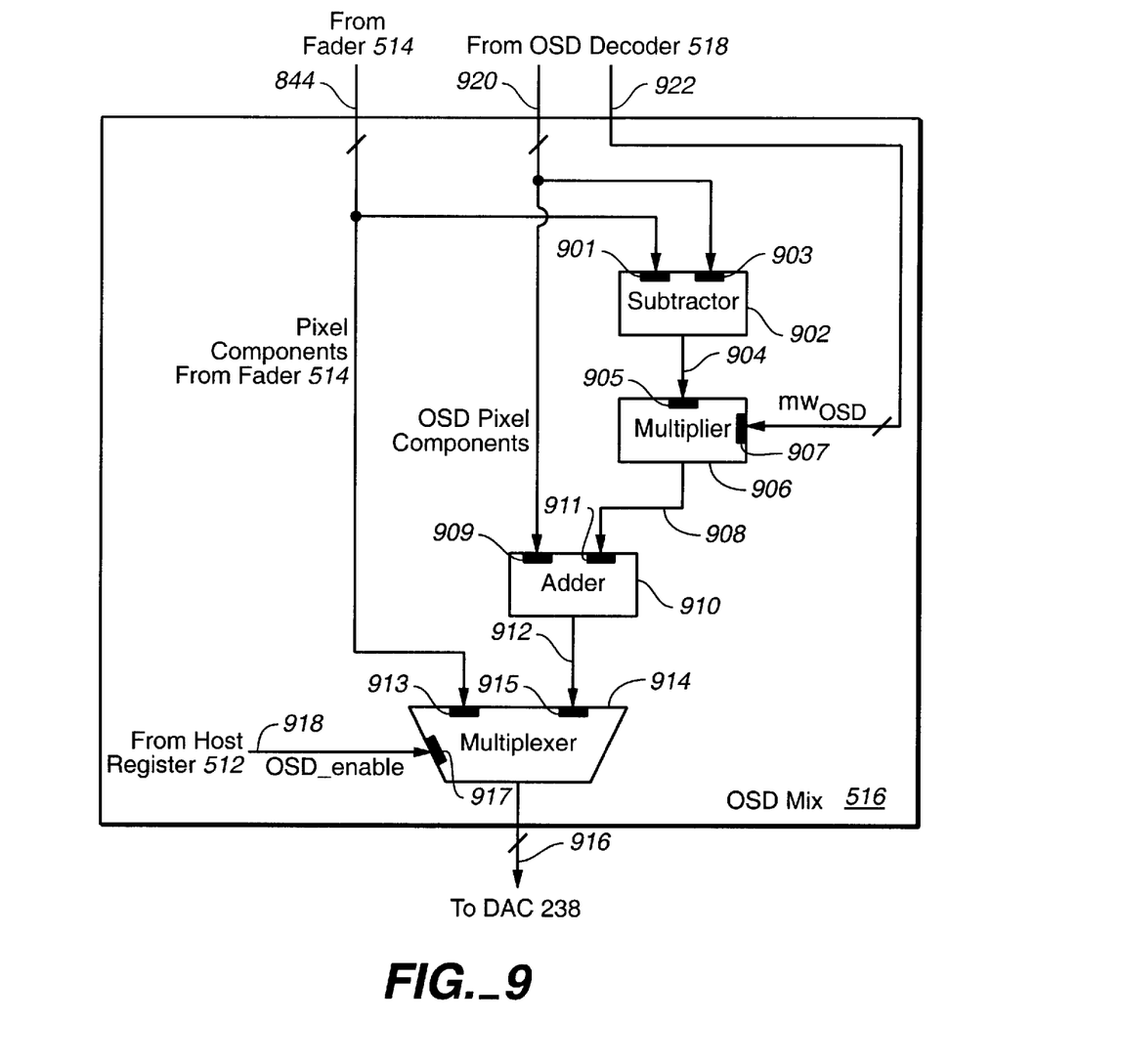
FIG. 9 illustrates, in a block diagram, an embodiment of an on-screen display mix 516 (also called "OSD mix") of FIG. 5A.

A multiplier 906 has ports 905 and 907 respectively coupled to buses 904 and 922. Bus 922 carries the OSD mix weight (e.g., "$mw_{OSD}$") from OSD decoder 518. Multiplier 906 multiplies the signal received on port 905 with the signal of the OSD mix weight and provides a product signal on a bus 908. An adder 910 has ports 909 and 911 respectively coupled to buses 920 and 908. Adder 910 adds the signal received on port 909 to the signal received on port 911 and provides a result signal on a bus 912.

A multiplexer 914 has ports 913 and 915 respectively coupled to buses 844 and 912. Multiplexer 914 also has a control terminal 917 coupled to a line 918 that carries a control signal (e.g., "signal OSD_enable") from OSD_enable bit 512B in host register 512. If OSD_enable bit 512B is active, multiplexer 914 propagates the signals received on terminal 915 (a pixel component of an OSD mix image) to a bus 916. Otherwise, multiplexer 914 propagates the signals received on terminal 913 (a pixel component of the video image received from fade circuit 514) to bus 916. Bus 916 is coupled to DAC 238 (FIG. 3). DAC 238 converts the pixel components into analog signals for display on monitor 106 (FIG. 2A).

In one variation, an OSD mix 520 (FIG. 10) includes a multiplier 1002, a multiplier 1004, and an adder 1010. Multiplier 1002 has ports 1001 and 1009 respectively coupled to buses 844 and 922. Multiplier 1002 multiplies the signal received on port 1001 with the signal of the OSD mix weight received on port 922 and provides a product signal on a bus 1006.

Figure 10:
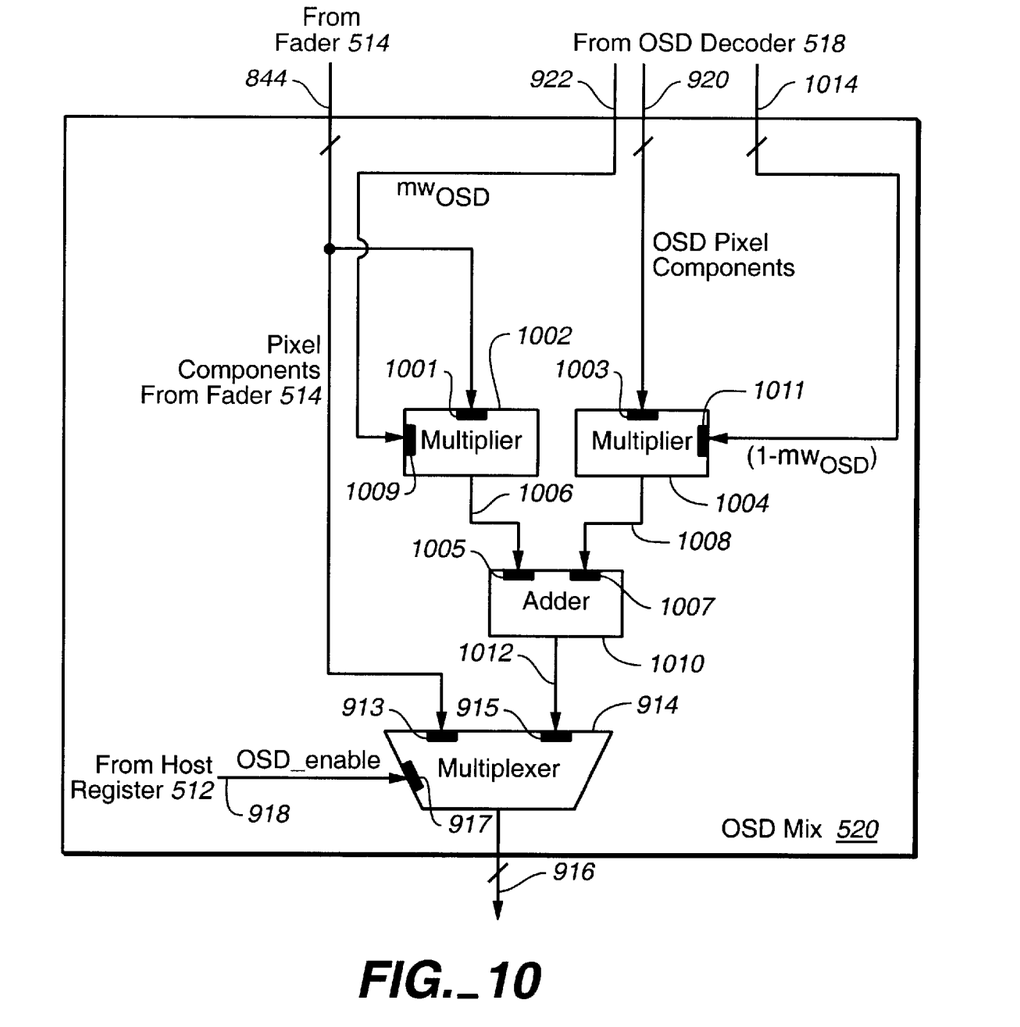
FIG. 10 illustrates, in a block diagram, another embodiment of the OSD mix 520 of FIG. 5A.

Multiplier 1004 has ports 1003 and 1011 respectively coupled to buses 920 and 1014. Bus 1014 carries a signal of one less the OSD mix weight (e.g., $1-mw_{OSD}$). Bus 1014 is, for example, from OSD decoder 518. Multiplier 1004 multiplies the signal received on port 1003 received on port 1011 and provides a product signal on a bus 1008.

Adder 1010 has ports 1005 and 1007 respectively coupled to buses 1006 and 1008. Adder 1010 adds the signals received on port 1005 and port 1007 and provides a result signal on a bus 1012. In this variation, port 915 of multiplexer 914 is coupled to bus 1012.

Numerous modifications and adaptations of the embodiments described herein will be apparent to the skilled artisan in view of the disclosure. As one example, the SPU mix 510 can be similarly configured as OSD Mix 520 of FIG. 10, where subtractor 702, multiplier 706, and adder 710 are replaced by two multipliers and an adder. Also, instead of using the linear arithmetic operations to implement fade in and fade out, a nonlinear operation can be used. Instead of using a single arithmetic unit 848 (FIG. 2B and FIG. 8) for both chroma values, two arithmetic units can be used, one for each chroma value. Also instead of adjusting the pixel components of luma, chroma blue, and chroma red, fader 514 can be used to adjust pixel components in other color space such as RGB and YUV. Numerous such changes and modifications are encompassed by the attached claims.

APPENDIX A

-- q has layer 2 (spu) mixed IN
PROCESS (reset, clk)
variable tmp : integer;
variable tmp_luma : integer;
variable tmp_chroma : integer;
variable tmp_chroma_fade_out : integer;

APPENDIX A-continued

```
    variable tmp_chroma_scaled : integer;
    variable chroma_scaled_vec : std_logic_vector(21 downto
0);
    variable tmp_fade_out : integer;
    BEGIN
        IF (reset = '1') THEN
            q <= ( others => '0' );
        ELSEIF (clk'EVENT AND clk = '1') THEN
            IF ((spu_enable = '0') OR (video_only = '1'))
THEN
                tmp := 32 * b_int;
            ELSE
                tmp := 32 * a_int + z_int;
            END IF;
            tmp_luna      :=
conv_integer(signed(fade_out_1));
            tmp_chroma: = conv_integer(signed(fade_out_c));
            IF (fade_out_en = '1' AND pel_is_main = '1')
THEN
                IF (pel_state_2d(0) = '0') THEN --
chroma
                    -- b_int = tmp*2, tmp=*2, tmp_b_int*32,
thus tmp_chroma * 64
                    tmp_chroma_scaled := (tmp -
128*64) * tmp_chroma;
                    chroma_scaled_vec :=
conv_std_logic_vector(tmp_chroma_scaled,22);
                    tmp_chroma_fade_out :=
                        conv_integer(signed(chroma_scaled_vec(21
                        downto 8)));
                    tmp_fade_out :=
tmp_chroma_fade_out + 128*64;
                ELSE
                    tmp_fade_out := tmp - tmp_luna *
64;
                    IF (tmp_fade_out < 0) THEN
tmp_fade_out := 0;
                    ELSIF (tmp_fade_out > 64*255)
THEN tmp_fade_out := 64*255;
                    END IF;
                END IF;
            ELSE
                temp _fadeout := tmp;
            END IF:
            q <= conv_std_logic_vector (tmp_fade_out,
14);
        END IF;
    END PROCESS;
```

What is claimed is:

1. A method for fading a video signal, the method comprising:

changing a first chroma value in response to a scale factor to form a faded chroma value;

changing a first luma value by subtracting a fade factor to form a faded luma value;

displaying a pixel generated from at least the faded chroma and the faded luma values;

mixing the faded chroma value with a second chroma value to form a mixed chroma value; and mixing the faded luma value with a second luma value to form a mixed luma value.

2. The method of claim 1, wherein the changing of the first chroma value includes performing an arithmetic operation.

3. The method of claim 2, wherein the arithmetic operation comprises:

subtracting a predetermined value from the first chroma value to form a resultant;

multiplying the resultant with said scale factor to form a product; and adding the predetermined value to the product to form the faded chroma value.

4. The method of claim 1, wherein the mixing of the faded chroma value and the second chroma value comprises:

multiplying the faded chroma value with a mix weight (mw) to form a first product and multiplying the second chroma value with one minus the mix weight (1−mw) to form a second product; and adding the first product and the second product to form the mixed chroma value.

5. The method of claim 1, wherein the mixing of the faded chroma value and the second chroma value comprises:

subtracting the second chroma value from the faded chroma value to form a resultant;

multiplying the resultant with a mix weight (mw) to form a product; and adding the second chroma value to the product to form the mixed chroma value.

6. The method of claim 1, wherein the mixing of the faded luma value and the second luma value comprises:

multiplying the faded luma value with a mix weight (mw) to form a first product and multiplying the second luma value with one minus the mix weight (1−mw) to form a second product; and adding the first product and the second product to form the mixed luma value.

7. The method of claim 1, wherein the mixing of the faded luma value and the second luma value comprises:

subtracting the second luma value from the faded luma value to form a resultant;

multiplying the resultant with a mix weight (mw) to form a product; and adding the second luma value to the product to form the mixed luma value.

8. The method of claim 1, further comprising:

changing the second chroma value to form another faded chroma value;

changing the second luma value to form another faded luma value;

displaying a first image including a first pixel generated from at least the first chroma and the first luma values; and displaying a second image including a second pixel generated from at least the second chroma and the second luma values.

9. The method of claim 1, further comprising:

changing the second chroma value to form another faded chroma value, wherein a single circuit is used in said changing of the first chroma value and said changing of the second chroma value, said circuit being time shared such that said circuit first changes the first chroma value and then changes the second chroma value.

10. A circuit for fading a video signal comprising a fade circuit comprising:

a first arithmetic unit having (i) a first port coupled to a first bus carrying a chroma signal and (ii) a second port coupled to a second bus carrying a scale signal, wherein the first arithmetic unit adjusts the chroma signal using the scale signal;

a second arithmetic unit having (i) a third port coupled to a third bus carrying a luma signal and (ii) a fourth port coupled to a fourth bus carrying a fade signal, wherein the second arithmetic unit adjusts the luma signal using the fade signal; and a clipper having a fifth port coupled to a fifth bus of the second arithmetic unit, wherein the fifth bus carries a difference between the luma signal and the fade signal, the clipper outputs on a sixth bus (1) a maximum signal when said difference is greater than the maximum signal, (2) a minimum signal when said difference is less than the minimum signal, or (3) said difference when said difference is less than the maximum signal and greater than the minimum signal.

11. The circuit of claim 10, wherein the second arithmetic unit is a subtractor, the subtractor subtracts the fade signal from the luma signal.

12. The circuit of claim 10, further comprising a demultiplexer having:
- a sixth port coupled to a seventh bus carrying a mixed signal;
- the first bus;
- the third bus; and
- a control terminal coupled to a line carrying a control signal, wherein the mixed signals comprise the chroma signal and the luma signal, the demultiplexer propagating the chroma signal to the first bus when the control signal is active, the demultiplexer propagating the luma signal to the third bus when the control signal is inactive.

13. The circuit of claim 10, further comprising a multiplexer having:
- a sixth port coupled to a seventh bus of the first arithmetic unit;
- a seventh port coupled to an eighth bus of the second arithmetic unit;
- a control terminal coupled to a line carrying a control signal; and
- a ninth bus, wherein the multiplexer propagates (1) the signals received on the sixth port to the ninth bus when the control signal is active and (2) the signals received on the seventh port to the ninth bus when the control signal is inactive.

14. The circuit of claim 10, wherein the first arithmetic unit comprises:
- a subtractor having a sixth port coupled to the first bus and a seventh port coupled to a seventh bus carrying a predetermined signal, wherein the subtractor subtracts the predetermined signal from the chroma signal and outputs a first resultant signal on an eighth bus;
- a multiplier having an eighth port coupled to the eighth bus and a ninth port coupled to the second bus, wherein the multiplier multiplies the first resultant signal with the scale signal and outputs a product signal on a ninth bus; and
- an adder having a tenth port coupled to the ninth bus and an eleventh port coupled to the seventh bus, wherein the adder adds the predetermined signal to the product signal and outputs a second resultant signal on a tenth bus.

15. The circuit of claim 14, wherein the first arithmetic unit further comprises a second clipper having a twelfth port coupled to the tenth bus, wherein the second clipper outputs on an eleventh bus (1) a second maximum signal when the second resultant signal is greater than the second maximum signal, (2) a second minimum signal when the second resultant signal is less than the second minimum signal, or (3) the second result signal when the second resultant signal is less than the second maximum signal and greater than the second minimum signal.

16. The circuit of claim 10, further comprising a mix circuit having:
- a subtractor having a sixth port coupled to a seventh bus of the fade circuit carrying a first pixel signal and a seventh port coupled to an eighth bus carrying a second pixel signal, wherein the subtractor subtracts the second pixel signal from the first pixel signal to form a first resultant signal on a ninth bus;
- a multiplier having an eighth port coupled to the ninth bus and a ninth port coupled to a tenth bus carrying a mix weight signal, wherein the multiplier multiplies the first resultant signal with the mix weight signal to form a product signal on an eleventh bus; and
- an adder having a tenth port coupled the eighth bus and an eleventh port coupled to the eleventh bus, wherein the adder adds the second pixel signal to the product signal to form a second resultant signal on a twelfth bus.

17. The circuit of claim 10, further comprising a mix circuit having:
- a first multiplier having a sixth port coupled to a seventh bus of the fade circuit carrying a first pixel signal and a seventh port coupled to an eighth bus carrying a mix weight (mw) signal, wherein the first multiplier multiplies the first pixel signal with the mix weight signal to form a first product signal on a ninth bus;
- a second multiplier having an eighth port coupled to a tenth bus carrying a second pixel signal and a ninth port coupled to an eleventh bus carrying one minus the mix weight signal (1−mw), wherein the multiplier multiplies the second pixel signal with the one minus the mix weight signal (1−mw) to form a second product signal on a twelfth bus; and
- an adder having a tenth port coupled to the ninth bus and an eleventh port coupled to the twelfth bus, wherein the adder adds the first product signal and the second product signal to form a resultant signal on a thirteenth bus.

18. The circuit of claim 10, further comprising a mix circuit having:
- a subtractor having a sixth port coupled to a seventh bus carrying a first pixel signal and a seventh port coupled to an eighth bus carrying a second pixel signal, wherein the subtractor subtracts the second pixel signal from the first pixel signal to form a first resultant signal on a ninth bus;
- a multiplier having an eighth port coupled to the ninth bus and a ninth port coupled to a tenth bus carrying a mix weight signal, wherein the multiplier multiplies the first resultant signal with the mix weight signal to form a product signal on an eleventh bus; and
- an adder having a tenth port coupled the eighth bus and an eleventh port coupled to the eleventh bus, wherein the adder adds the second pixel signal to the product signal to form a second resultant signal on a twelfth bus, the twelfth bus coupled to either the first port of the first arithmetic unit or the third port of the second arithmetic unit.

19. A method for fading a video signal, the method comprising:
- changing a first chroma value in response to a scale factor to form a faded chroma value;
- changing a first luma value by subtracting a fade factor to form a faded luma value;
- displaying a pixel generated from at least the faded chroma and the faded luma values; and
- mixing the faded chroma value with a second chroma value to form a mixed chroma value.

* * * * *